US010266002B2

(12) United States Patent
Ratgen

(10) Patent No.: US 10,266,002 B2
(45) Date of Patent: Apr. 23, 2019

(54) WHEEL ARRANGEMENT

(71) Applicant: Tyre Trade DK ApS, Vejen (DK)

(72) Inventor: Felix Paludan Ratgen, Vejen (DK)

(73) Assignee: TYRE TRADE DK APS, Vejen (DK)

( * ) Notice: Subject to any disclaimer, the term of this patent is extended or adjusted under 35 U.S.C. 154(b) by 398 days.

(21) Appl. No.: 14/914,810

(22) PCT Filed: Aug. 29, 2014

(86) PCT No.: PCT/DK2014/050256
§ 371 (c)(1),
(2) Date: Feb. 26, 2016

(87) PCT Pub. No.: WO2015/028026
PCT Pub. Date: Mar. 5, 2015

(65) Prior Publication Data
US 2016/0207350 A1    Jul. 21, 2016

(30) Foreign Application Priority Data

Aug. 29, 2013    (DK) .................................. 2013 00491

(51) Int. Cl.
| B60B 3/00 | (2006.01) |
| B60B 11/06 | (2006.01) |
| B60B 3/04 | (2006.01) |
| B60B 23/06 | (2006.01) |
| B60B 11/00 | (2006.01) |

(52) U.S. Cl.
CPC ................ B60B 3/007 (2013.01); B60B 3/04 (2013.01); B60B 3/044 (2013.01); B60B 11/00 (2013.01);

(Continued)

(58) Field of Classification Search
CPC ......... B60B 11/00; B60B 11/02; B60B 11/06; B60B 3/002; B60B 3/004; B60B 3/005; B60B 3/007; B60B 3/08
See application file for complete search history.

(56) References Cited

U.S. PATENT DOCUMENTS 1,629,903 A * 5/1927 Benedict ................. B60B 11/06
301/35.628
3,410,605 A * 11/1968 Mayrath ............... B23K 11/093
301/64.201
(Continued)

FOREIGN PATENT DOCUMENTS

DE    40 25 064 A1    2/1992
EP    1 099 571 A2    5/2001
(Continued)

*Primary Examiner* — Jason R Bellinger
(74) *Attorney, Agent, or Firm* — David S. Safran; Roberts Mlotkowski Safran Cole & Calderon, P.C.

(57) ABSTRACT

The present invention concerns a wheel construction as well as a method for making such a wheel construction for e.g. a construction or agricultural machine, such as a tractor, wherein the wheel construction at least includes a wheel rim made up of a rim ring for mounting a first tire and further includes a hub plate which at its outer periphery is fixed to the rim ring at a distance X1 from an annular edge thereof, and extending internally in the first rim ring between the rim ring and the central axis of the first wheel rim (rotary axis of the wheel rim), the first hub plate at an inner periphery including a number of holes and a contact face for mechanical and detachable fixing to either a central hub plate or directly to a hub of a vehicle.

12 Claims, 8 Drawing Sheets

(52) U.S. Cl.
CPC .............. *B60B 11/06* (2013.01); *B60B 23/06* (2013.01); *B60B 2310/206* (2013.01); *B60B 2310/208* (2013.01); *B60B 2310/228* (2013.01); *B60B 2310/302* (2013.01); *B60B 2320/10* (2013.01); *B60B 2360/102* (2013.01); *B60B 2900/112* (2013.01); *B60B 2900/113* (2013.01); *B60B 2900/311* (2013.01); *B60B 2900/351* (2013.01); *B60B 2900/70* (2013.01); *B60Y 2200/22* (2013.01)

(56) References Cited

U.S. PATENT DOCUMENTS

| | | | | |
|---|---|---|---|---|
| 4,164,358 A | * | 8/1979 | Entrup | ................... B60B 11/02 296/198 |
| 4,279,446 A | | 7/1981 | Bushmeyer et al. | |
| 4,787,679 A | * | 11/1988 | Arnold | ................... B60B 11/06 301/13.2 |
| 6,390,564 B1 | * | 5/2002 | Thomas | ................. B60B 11/00 301/13.2 |
| 7,331,637 B2 | * | 2/2008 | Hill | ........................ B60B 11/06 301/35.628 |
| 2008/0054714 A1 | | 3/2008 | Morrow | |

FOREIGN PATENT DOCUMENTS

| | | |
|---|---|---|
| GB | 140 594 A | 4/1920 |
| GB | 576 385 A | 4/1946 |
| GB | 609 657 A | 10/1948 |
| GB | 689 649 A | 4/1953 |
| GB | 2 058 686 A | 4/1981 |
| WO | 2011/126463 A1 | 10/2011 |
| WO | 2013/068018 A1 | 5/2013 |

* cited by examiner

WHEEL ARRANGEMENT

BACKGROUND OF THE INVENTION

Field of the Invention

The present invention concerns a wheel construction for e.g. a construction or agricultural machine, such as a tractor, where the wheel construction at least includes a first wheel rim made up of a first rim ring for mounting a first tyre and further including a first hub plate with an outer periphery, the first hub plate at outer periphery being fixed to the rim ring at a distance X1 from an annular edge thereof, and extending internally in the first rim ring between the rim ring and the central axis of the first wheel rim (rotary axis of the wheel rim), the first hub plate at an inner periphery including a number of holes and a contact face for mechanical and detachable fixing to either a central hub plate or directly to a hub of a vehicle, wherein a possible central hub plate at an outer periphery includes a contact face and holes for direct or indirect joining with the first hub plate at its inner periphery, and at an inner periphery including a contact face and holes for joining with a hub on a vehicle.

Description of Related Art

The invention also relates to a method for manufacturing such a wheel construction.

It is commonly known that wheel rims suited for use on construction and agricultural machines are made of steel with a rim ring and a with a hub plate. Wheel constructions that include wheel rims with rim ring and hub plate in steel are used on many other types of vehicles. A typical design is that the rim ring is rolled in the wanted diameter and made with wheel rim edges and other geometric shapes such that a tyre can be fitted thereon. The hub plate typically consists of a steel plate that may be plane but which is typically shaped with one or more depressions—concave/convex. These depressions have partly the purpose of stiffening the hub plate and partly the purpose of offsetting the contact surfaces that are secured to a hub on a vehicle and to the inner side of the rim ring. On such a wheel rim is mounted a tyre suited for the specific purpose for which the machine in question is to be applied.

WO 2013/068018 A1 discloses a wheel rim and a method for making a wheel rim of the type suitable for use on an agricultural or construction vehicle, wherein the central hub plate at the outer periphery includes a number of tabs extending away from the centre of the central hub plate, where the second hub plate at its inner periphery also includes a number of tabs extending towards the centre of the hub plate, where the tabs have a geometric shape such that the tabs fit between each other, where the tabs include holes arranged at the same pitch circle diameter and at right angles to the tabs. In connection with the making of the hub plate, the second hub plate and the central hub plate can be produced from a single piece of suitable material, preferably steel plate, as the mentioned tabs extend over each other when two parts are separated and turned such that the tabs come to lie upon each other. The two hub plate parts are then joined by bolts in the holes formed in the mentioned tabs.

Over time, construction machines as well as agricultural machines have become larger and larger, and in order to minimise the impact of the weight of the machines on the base it is common to fit these machines with even very wide tyres, such as twin or terra tyres that can be e.g. 800, 900 or 1050 mm wide, or even wider. These types of tyres are wider than traditional tyres and thereby make less impact on the base, e.g. a field with crops, than a corresponding narrower standard tyre would do, thereby attaining a reduced field pressure. A reduced field pressure is precisely an important parameter in order to achieve an optimal production of crops since compressed soil does not produce a good yield.

In particular tractor tyres furthermore have a marked pattern on the tread of the tyre and typically include two rows, each with an amount of distinct oblique ribs, called pattern blocks that are pressed into the base, whereby the power from the tractor is transmitted to the base. On the very wide twin and terra tyres there may, however, be a drawback by these large pattern blocks since it is not always easy to ensure that the pattern blocks are pressed sufficiently into the base.

At the same time, by the wide tyres such as twin and terra tyres it is also necessary to regulate the air pressure in the tyres to a lower level when working in the field, whereas during transport on road, typically occurring with higher speed, there is a need for increased air pressure. The reason for this is that the best power transmission to the base is achieved by a low air pressure, why it used in the field, while the same low air pressure causes a very unstable and "floating" experience while driving on a solid base such as a tarmac road, and at higher speed. Traffic safety is therefore improved by increasing pressure in the tyres while driving on public roads.

The large and wide twin and terra tyres have been very expensive for a long time, and the cost has now increased even more, and unfortunately a corresponding longer service life of the tyres has not been achieved. In principle, the large twin and terra tyres are a necessary evil as the tyres are preferred in daily use, but price as well as wearability, and not the least the need of constant changing of the air pressure is a nuisance and a source to rising costs.

SUMMARY OF THE INVENTION

It is the object of this invention to indicate a solution to the above mentioned problems where a construction or agricultural machine, such as a tractor, can be fitted with a wheel construction that has optimal carrying capacity, optimal contact pressure against the base whereby the pattern blocks on the tyres are more easily pressed into the base and whereby a hitherto unseen flexibility in the construction of the wheel rim is achieved. Furthermore, it is an object to indicate a solution whereby a saving of production time as well of materials is achieved, and where the production cost of the finished product is lower than that of hitherto known products.

As mentioned in the introduction, the invention concerns a wheel construction for e.g. a construction or agricultural machine, such as a tractor, where the wheel construction at least includes a first wheel rim made up of a first rim ring for mounting a first tyre and further including a first hub plate with an outer periphery, the first hub plate at outer periphery being fixed to the rim ring at a distance X1 from an annular edge thereof, and extending internally in the first rim ring between the rim ring and the central axis of the first wheel rim (rotary axis of the wheel rim), the first hub plate at an inner periphery including a number of holes and a contact face for mechanical and detachable fixing to either a central hub plate or directly to a hub of a vehicle, wherein a possible central hub plate at an outer periphery includes a contact face and holes for direct or indirect joining with the first hub plate at its inner periphery, and at an inner periphery including a contact face and holes for joining with a hub on a vehicle.

Initially, this is a wheel construction with a rim ring with a hub plate wherein the hub plate is either mounted directly on the hub of a tractor or the like, or where one or more other hub plates or fittings are applied between the hub itself of a vehicle and the said hub plate.

The new feature of a wheel construction according to the invention is that the inner periphery on the hub plate of the wheel construction is displaced or offset by the distance Y1 along the central axis of the wheel rim in relation to the outer periphery of the hub plate, where the outer periphery of the hub plate is circular/cylindrical as seen in direction of the central axis of the wheel rim, where the hub plate includes a central part, where in radial direction a number of flaps, e.g. 4, 6, 8, 10, 12 or more flaps extend from the central part, where part of these flaps are bent in a first direction, each with a design at the outer periphery such that by a set of bent flaps a circular/cylindrical outer periphery with a given diameter is formed.

It is hereby possible to produce a hub plate of a plane material as the said flaps can be bent about a straight bending line, preferably near the inner periphery of the hub plate. At the periphery of the hub plate corresponding to the periphery of the individual flap, the flaps can be with a contact area for bearing against the rim ring or against a fitting thereon. The flaps can be welded on the rim ring or bolted to flanges on the rim ring, and the hub plate can advantageously be made of edge bent, plane material, e.g. of a suitable steel alloy.

Individual flaps can be identical in shape and size, but may also be different both with regard to length and to angular size. For example, one flap can be with a length from the centre of the hub plate to the outer periphery of 500 mm and have an angular extent of 40°, while one adjacent flap can have a length of 550 mm and an angular extent of 50°. Such a hub plate can thus include four flaps of a certain design and four other flaps with a different design.

By flaps of different length there may be achieved at least two different results:

Firstly, it can be achieved that the individual flaps are bent to one and the same side and thus form a circular diameter corresponding to the inner diameter of the rim ring. Individual flaps are not, however, to be bent at the same angle, and the contact area on the periphery of the flaps will therefore be displaced as well, and one set of flaps will be at one distance from the edge of the rim ring whereas a second set of flaps will be at a second distance from the edge of the rim ring. Secondly, it can be achieved that one set of flaps are bent to one side and that another set of flaps are bent to the other side. Two rim rings can hereby be mounted on the same hub plate. It may e.g. be so that short flaps are bent to one side whereas long flaps are bent to another side. It is also possible that more flaps are bent to one side than to the other side, and that the flaps can have more than two different lengths, as three, four as well as five or even more different flap lengths can be applied. The two sides of the hub plate can have the same outer diameter, but different outer diameters are possible as well. A hub plate for a wheel construction as the mentioned can be with contact faces for mounting on a hub of a vehicle but may also serve the purpose of providing spacing between two rim rings.

In a variant of a wheel construction according to the invention, the first hub plate, which at the outer periphery is fixed to the rim ring at a distance X1 from one annular edge of it, can be with a distance X1 varying along the outer periphery on the individual flap, where the variation is substantially sinusoidal. The forces transmitted from e.g. a hub of a tractor to the hub plate and further to a rim ring and via a tyre to the base are hereby transmitted better and more evenly as the contact area between the hub plate and the rim ring is increased due to the curving shape. A traditional joint between a rim ring and a hub plate is rectilinear in the peripheral direction of the wheel rim, thus having the same length as the diameter of rim ring and hub plate, respectively. According to the invention, this joining line winds in and out according to a sinusoidal curve, and the length and the area of a welding between hub plate and rim ring increase thereby, resulting in a stronger joint and thereby the possibility of higher power transmission. The joining of the outer periphery as seen perpendicularly to the central axis of the wheel rim is substantially sinusoidal as the flaps are plane and fixed at an angle to a circular rim ring.

By bending the flaps to the same side and at the same angle, it is possible to weld the flaps in radial direction, which may provide an even stronger design, while different lengths of the flaps entail that the flaps are fixed offset in the rim ring and thereby with a given spacing between the flaps as seen in direction of the central axis of the wheel construction.

In a variant of a wheel construction according to the invention, the wheel construction may further include a second wheel rim, the second wheel rim made up of a second rim ring for mounting a second tyre, and further including a second hub plate including an outer periphery, the second hub plate being fixed to the second rim ring at a distance X2 from one annular wheel rim thereof and extending internally in the second rim ring towards the central axis of the second wheel rim, where the second hub plate at an inner periphery includes a number of holes and a contact face for mechanical and detachable fixing to either the first hub plate, a central hub plate or directly to a hub on a vehicle.

Such a wheel rim may in principle be identical with the above mentioned wheel rim, and two such wheel rims may advantageously be bolted or welded together and together form a wheel, notably, one wheel with two rim rings, each rim ring being fitted with a tyre. Such a wheel construction can thus be provided with traditional and not so wide tyres and may e.g. substitute a wheel with the above mentioned expensive and wide twin or terra tyres. This implies several advantages, including the fact that two traditional tyres have a total lower price than one of the twin or terra tyres but with a corresponding carrying capacity and stability. The stability is even higher as regards driving with reduced air pressure in that by a wheel construction according to the invention there are two traditional tyres, e.g. tractor tyres, each being narrower than the wide tyre types. A wheel will thereby comprise four tyre sides, namely two for each individual tyre. This plurality of tyre sides entail that the floating sense associated with the very large and wide tyres is avoided. Thus there is no need for changing the air pressure in the tyre to the same degree as by twin and terra tyres when driving on field and on road, respectively.

A further advantage of this wheel construction is that four rows of not so long but still obliquely positioned pattern blocks are achieved that are more easily pressed down into the base—again compared with the wide twin and terra tyres.

A variant of a wheel construction according to the invention comprises that at least either the first or the second of the hub plates, or alternatively both hub plates, are offset and thus include an outer periphery which is offset relative to the inner periphery along the central axis of the two wheel rims, wherein the size of the offset of the first hub plate is Y1 and the size of the offset of the second hub pate is Y2, and where the total offset at the two hub plates, namely the sum of Y1 and Y2, is greater than the sum of X1 and X2. It is hereby possible to mount two rim rings with each their hub plate against each other and even with a given spacing between the rim rings.

As mentioned, the two wheel rims can be mounted with the hub plates against each other in mounting holes adapted for the purpose, and the hub plates can possibly via the same mounting holes be mounted on a hub for a vehicle or to a common central hub plate. By increasing the offset of one or both hub plates, or alternatively by mounting the hub plate closer to the side of the rim ring, a spacing of a given size can be provided between two rim rings and thereby a gap between respective individual tyres. Such a gap can be of modest size, though it may also have a size corresponding to the wheel construction straddling across one or more crops, e.g. maize or other types of crops.

A wheel construction according to the invention may therefore comprise that the first and the second wheel rims are bolted together, for example at the inner periphery of the first and the second hub plate, respectively, or at a central hub plate.

A wheel construction according to the invention may further include a spacer member including a central part, where in radial direction a number of flaps, e.g. 4, 6, 8, 10, 12 or more flaps, extend from the central part, where every other of these flaps are bent in a first direction while the rest of the flaps are bent in a different and opposite direction, where the flaps that are bent in the same direction each have a design at the outer periphery such that by a set of bent flaps a circular/cylindrical outer periphery with a given diameter is formed. Such a spacer member may e.g. be used in connection with a third rim ring with tyres mounted on a wheel construction as indicated above. At either side of e.g. a tractor there may thus be three tyres of which two are joined as permanent wheels on the vehicle, whereas the third can be mounted with fittings as known from the typical twin wheel mountings.

The flaps of such a spacer member can have different length at each their side but also at the same side. The load is hereby distributed across a larger area on the rim ring which can be advantageous.

As mentioned in the introduction, the invention also concerns a method for making a wheel construction for e.g. a construction or agricultural machine, such as a tractor, where the wheel construction at least includes a first wheel rim made up of a first rim ring for mounting a first tyre, and further includes a first hub plate with an outer periphery, the first hub plate being fixed to the rim ring at a distance X1 from an annular edge thereof and extending internally in the first rim ring towards the central axis of the first wheel rim, the first hub plate at an inner periphery including a number of holes and a contact face for mechanical and detachable fixing to either a central hub plate or directly to a hub of a vehicle, wherein a possible central hub plate at an outer periphery includes a contact face and holes for direct or indirect joining with the first hub plate at its inner periphery, and at an inner periphery including a contact face and holes for joining with a hub on a vehicle.

The new feature of a method according to the invention is that the first hub plate is formed of a plane workpiece, as the workpiece is machined by a suitable tool, e.g. with a cutting tool such as a laser, plasma, water jet apparatus or the like, such that the hub plate is formed with an outer periphery with a number of projecting flaps, e.g. 4, 6, 8, 10, 12 or more flaps, these flaps having a shape at the outer periphery such that when respective flaps are formed, the first hub plate displays an offset between the outer and the inner peripheries with the size Y1 and at the same time appears with a circular/cylindrical outer periphery with a given diameter.

By working a plane material, e.g. a plate member of a suitable steel alloy, with a laser, plasma, water jet apparatus or by another suitable method, a hub plate can be formed without using expensive pressing and forging tools. The plane workpiece is cut and then the flaps are bent into a given angle. The shape of the periphery of the individual flaps is adapted such that at the actual angle it appears circular as seen in direction of the rotary axis of the wheel construction/hub plate.

A method for making a wheel construction according to the invention may comprise that the wheel construction is made of a first wheel rim and a second wheel rim, wherein the two wheel rims are joined directly or indirectly at their respective offset hub plates.

In a variant of a method for making a wheel construction according to the invention, the work piece of which at least the first hub plate is formed can be shaped, e.g. by pressing or forging, whereby the work piece is provided an embossing with a concave geometry, e.g. with a concave as well as a convex geometry.

Hereby is achieved a solution with advantages as described earlier in that the two hub plates can be offset and thus be in mutual contact without the respective rim rings being in contact, whereby rigidity, moment of inertia as well as adjusting options can be improved. The shaping of the hub plate can, as mentioned previously, advantageously be effected by bending, e.g. by using an edge bending machine, though the shaping may be effected by pressing and/or forging as well. The use of these methods provides the option of forming the hub plate with surfaces of double curvature, which may be attractive in special cases. However, it is obvious that by using forging and pressing, a marked increase in the cost of the production process arises, and at the same time some of the dynamics and flexibility in the production are lost.

A method for making hub plates with flaps that are bent up and subsequently welded in the rim ring is very suited for production in small series as there is practically no setup time for the various machines used. On the other hand, if pressing and forging is to be performed, it will require special production machines that are expensive in operation as well as moulds and tools that only allow production of a specific item. This hitherto used method is therefore expensive and advanced and completely unsuitable for production of small series.

By the invention it has been acknowledged that hub plates easily and without substantial challenges can be cut, shaped by simple tools and subsequently mounted in a rim ring and finally in a complete wheel construction. Actually, there is no appreciable difference between producing ten identical and ten different hub plates, respectively, by a method according to the invention, providing that a given wheel construction can be made in a very short time, as there is no waiting time in order to produce specific items. Thus hitherto unseen dynamics in the production are achieved whereby it is possible to perform production according to order instead of production in series.

In a variant of the method for making a wheel construction according to the invention it is further comprised that the cut and deformed hub plate is welded to the rim ring along the outer periphery of the flaps as the welding seam runs along a substantially sinusoidal path. This characteristic course of the welding seam is due to the fact that the plane hub plate workpiece, i.e. prior to bending, has a somewhat atypical shape which best can be described as a flower shape, the individual flaps being perceived as flower petals, which will appear from the following drawings and description thereof. The shape of the periphery of the flaps is obviously adapted such that it fits with the diameter in the rim ring. When a hub plate is formed in this way, the outer periphery on a hub plate corresponding to the outer periphery of a number of the said flaps can either be continuous or discontinuous and approximately sinusoidal. It is discontinuous if the flaps are bent to two sides or have different length, and continuous if the flaps are identical and bent to the same side. In case that flaps are bent to the same side and have the same length, it is furthermore possible that two adjacent flaps can be welded in radial direction, which also will be shown in the following drawings.

A wheel construction according to the invention can be used on all thinkable vehicles, including construction machines, agricultural machines, industrial machines, lorries and other types of vehicles, where e.g. one wheel can be substituted by a wheel construction according to the invention, wherein a wheel construction at least includes two rim rings with each their tyre and with two joined hub plates, or alternatively two rim rings with tyres and with a common hub plate.

The invention is described in the following with reference to the drawing, wherein:

DETAILED DESCRIPTION OF THE INVENTION

In the explanation of the Figures, identical or corresponding elements will be provided with the same designations in different Figures. Therefore, an explanation of all details will not necessarily be given in connection with each single Figure/embodiment.

Figure 1:
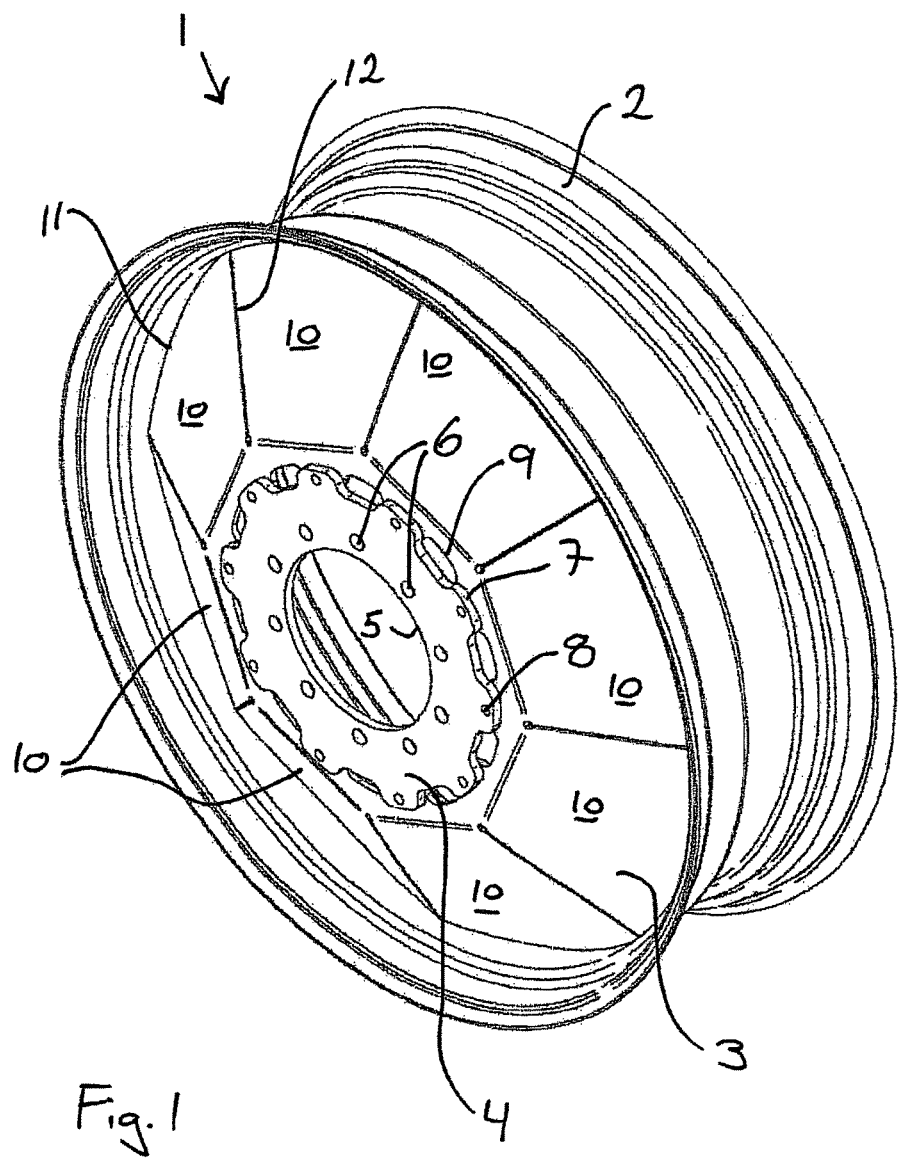
FIG. 1 shows a rim ring with hub plate.

In FIG. 1 appears a wheel construction 1 which in this variant consists of a rim ring 2 with a hub plate 3 and with a central hub plate 4. The central hub plate 4 is provided with mounting holes 6 at the inner periphery 5 for mounting on a hub of a vehicle. At the outer periphery 7, the central hub plate 4 is standardised such that via mounting holes 8 it can be joined with the hub plate 3 at its inner periphery 9. It is thus possible to use the same hub plate 3 for many wheel constructions 1 and only replace the central hub plate 4 according to the hub of the specific vehicle.

A number of flaps 10 extend from an area close to the inner periphery 9 on the hub plate 3. At the outer periphery of the flaps, corresponding to the outer periphery 11 of the hub plate, the hub plate 3 is fixed to the rim ring 2 at the inner surface thereof. A radial joint 12 is provided between adjacent flaps 10, being a slot in which no forces can be transmitted, but the radial joint 12 between two adjacent flaps 10 can also be a weld seam. As seen on FIG. 1, the hub plate 3 appears as an offset hub plate 3 as it—viewed from this side—appears convex. Moreover, the hub plate 3 appears with an edge appearance due to the plane flaps 10 that are all bent in the same angle and having the same length.

Figure 2:
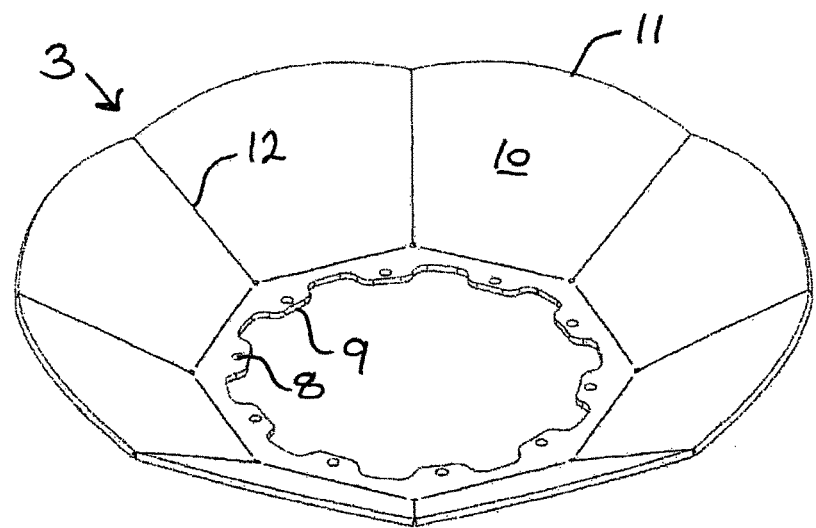
FIG. 2 shows an isometric view of a hub plate.

In FIG. 2, a hub plate is viewed isometrically, and it is clearly seen here that the flaps 10 exhibit a kind of "flower shape" as the outer periphery 11 of the hub plate 3 meanders with a curving form which is substantially sinusoidal. By this shape is compensated for the flaps 10 being plane and without double curvature as otherwise known from the prior art types of hub plates.

Figure 3:
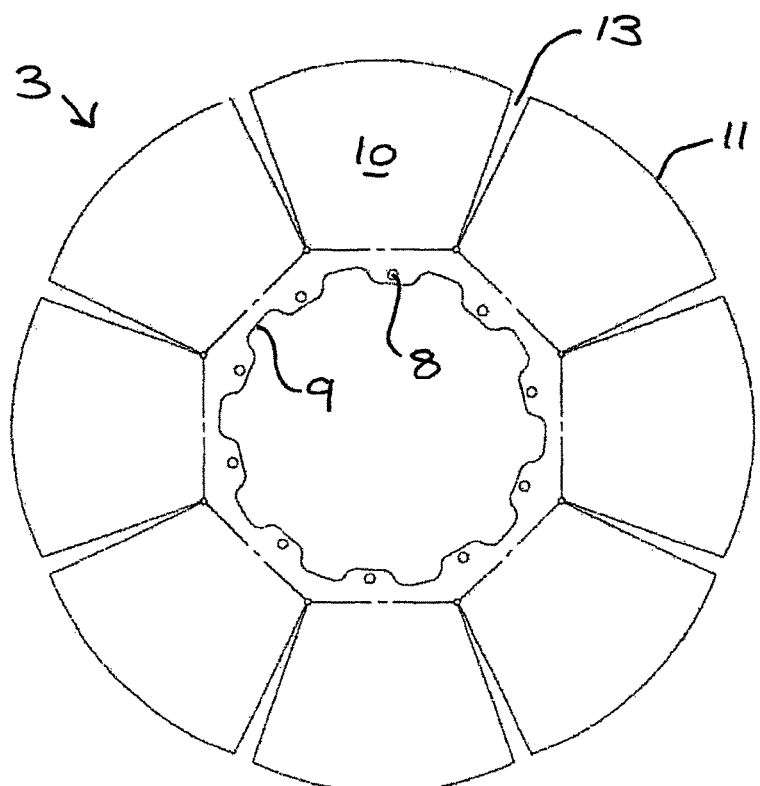
FIG. 3 shows a plane hub plate after cutting but before bending.

FIG. 3 shows a plane hub plate 3 after cutting but before bending. It appears that a wedge-shaped gap 13 exists between the flaps 10, entailing that after bending the flaps 10 will lie close to each other as seen on FIGS. 1 and 2. This wedge-shaped gap 13 is necessary when the flaps are to be bent to the same side and have the same length, as seen here and in FIGS. 1 and 2.

Figure 4:
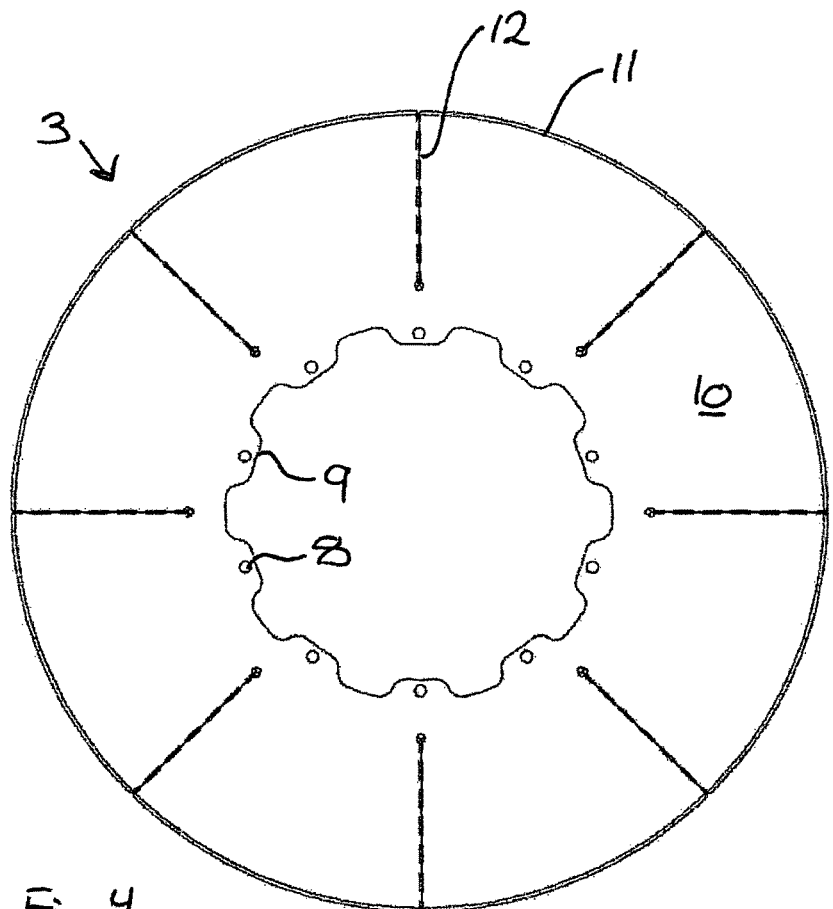
FIG. 4 shows a bent hub plate, as seen from the front.
Figure 5:
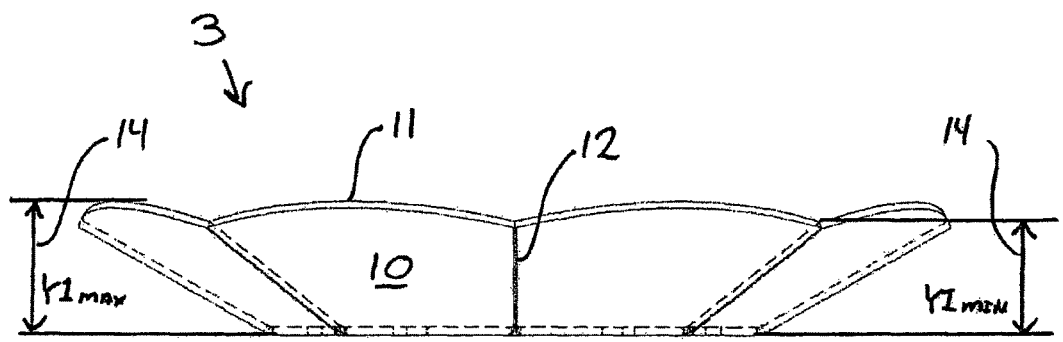
FIG. 5 shows a bent hub plate, as seen from the side.

FIG. 4 shows a bent hub plate 3 in a front view, and FIG. 5 shows a bent hub plate 3 seen from the side. In FIGS. 4 and 5 the hub plate is ready for mounting in a rim ring 2.

FIG. 5 furthermore shows clearly what is meant by the offset 14 of the hub plate. As the outer periphery 11 on the hub plate 3 is not in the same plane due to the shape of the flaps 10, the offset 14 has in principle a size that varies between a maximum and a minimum, where maximum Y1max is shown at one side, and where minimum Y1min is shown at the other side of FIG. 5.

Figure 6:
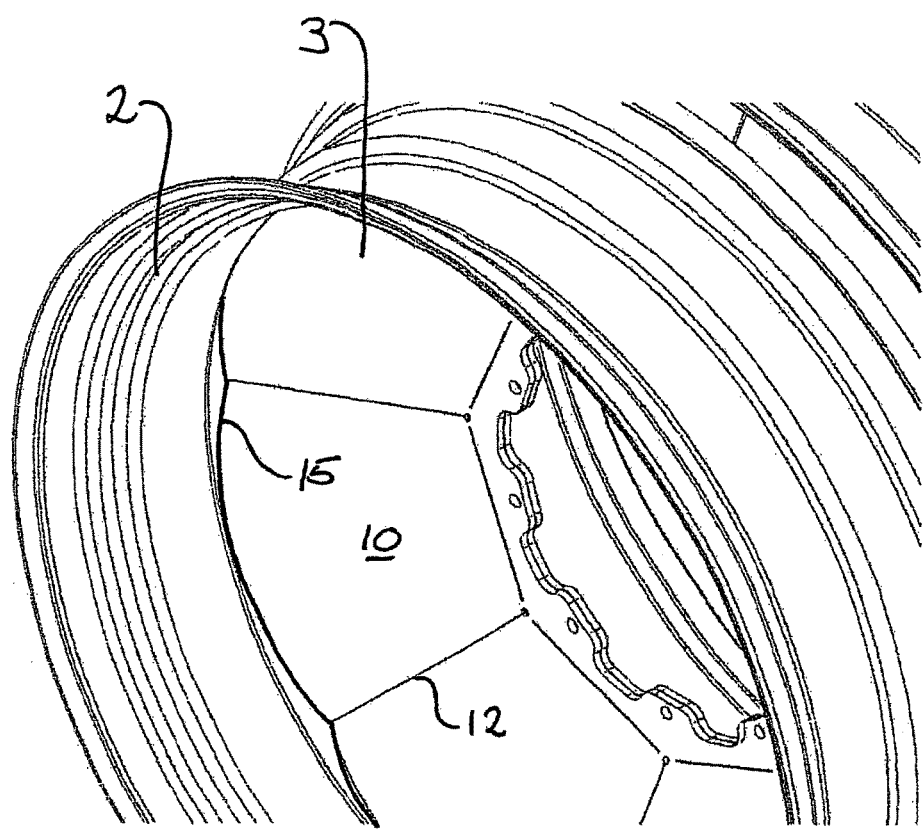
FIG. 6 shows a rim ring with hub plate as seen from the opposite side in relation to FIG. 1.

FIG. 6 shows a rim ring 2 with hub plate 3 seen from the opposite side in relation to FIG. 1 where the sinusoidal weld seam 15 at the outer periphery 11 on the hub plate 3 is clearly seen.

Figure 7:
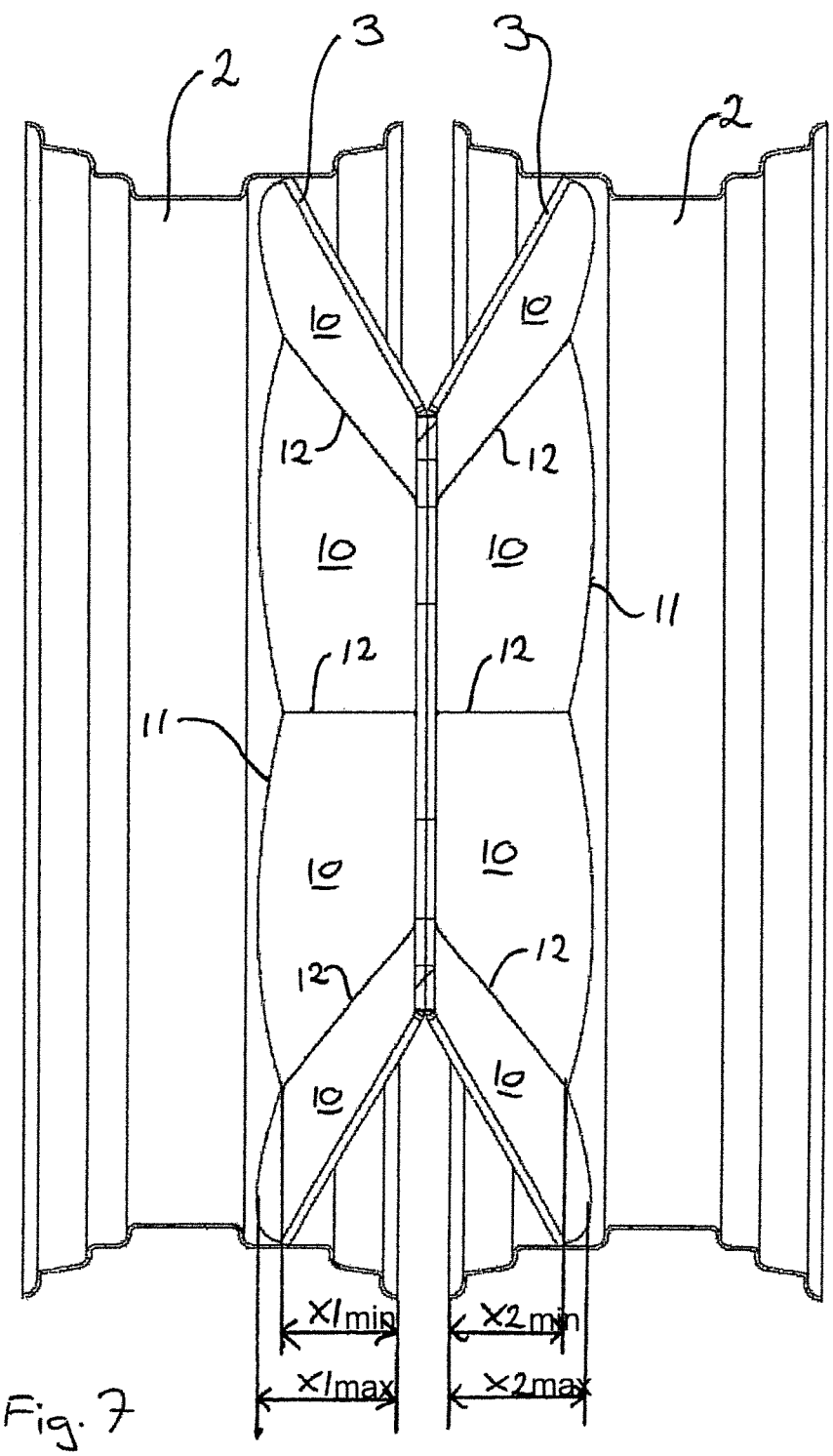
FIG. 7 shows a cross-section of two rim rings with each their hub plate.

FIG. 7 shows a cross-section of two rim rings 2 with each their hub plate 3, where the two hub plates 3 are shown close to each other and in principle ready for mounting of tires and for mounting on a vehicle. Such a wheel construction 1 can replace and in several of the above mentioned areas surpass the prior art wheel solutions with twin or terra tire mountings. This Figure moreover shows two examples of the distances $X1_{max}$, $X1_{min}$ and the distances $X2_{max}$, $X2_{min}$ that indicate the distances from a rim ring edge to the outer periphery 11 on a hub plate 3.

Figure 8:
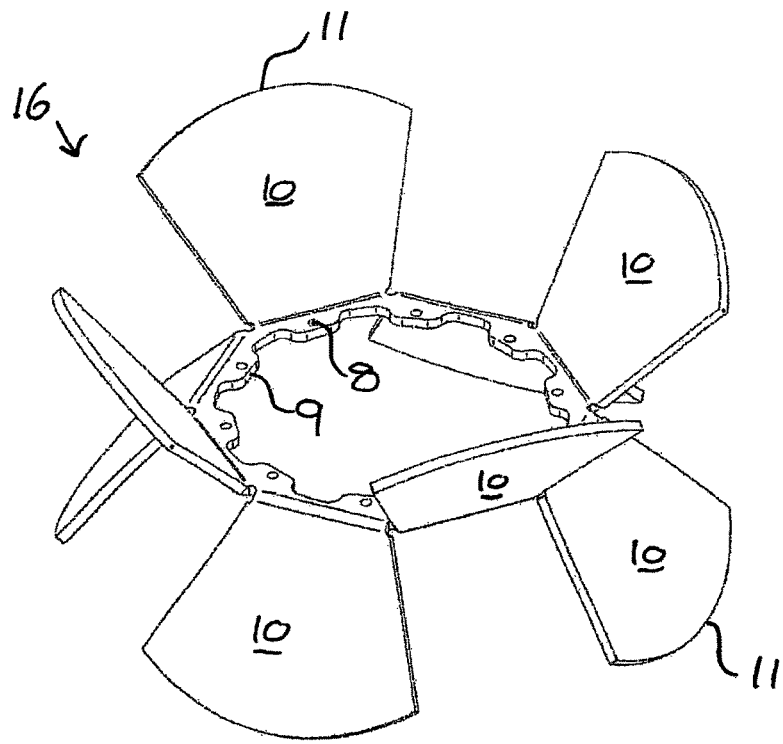
FIG. 8 shows an isometric view of a two-sided hub plate.

In FIG. 8 appears an isometrical view of a spacer member 16, also called a two-sided hub plate 16. Such a two-sided hub plate 16 has, as it appears from the Figure, flaps 10 which are bent to both sides. A rim ring 2 can thus be mounted on both sets of flaps 10. Another way of using this solution is to apply it as a spacer member 16, the purpose of which being to keep spacing between a rim ring 2 and another rim ring 2. This may e.g. be in case that the spacer member 16 is used in connection with mounting a detachable third wheel upon a wheel construction 1, as shown in FIG. 7. When the solution appearing in FIG. 8 is used as spacer member 16, there will typically also be used a kind of mounting bracket between respective rim rings 2 which, however, is not shown here.

Figure 9:
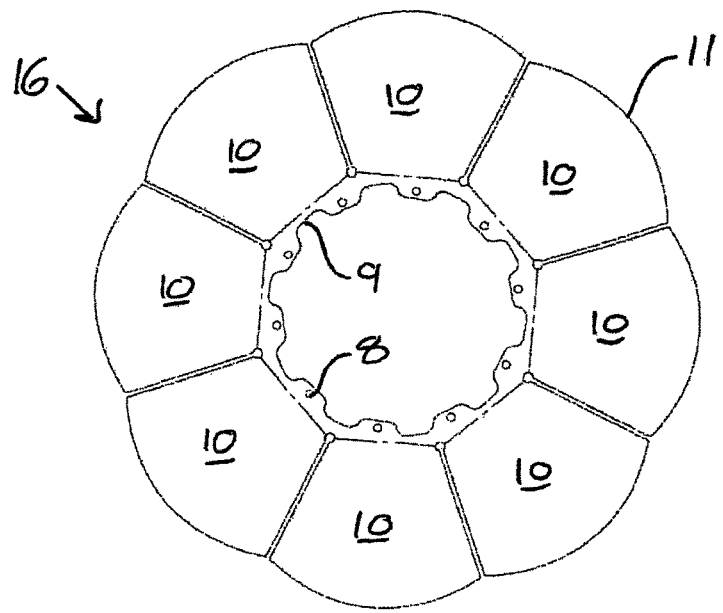
FIG. 9 shows a plane two-sided hub plate after cutting but before bending.

FIG. 9 shows a plane two-sided hub plate 16 after cutting but before bending. The previously mentioned wedge-shaped gap 13 between the adjacent flaps 10 is not seen here as this is not necessary since the flaps are to be bent to each their side and therefore do not need the free space required by the previously shown variants.

Figure 10:
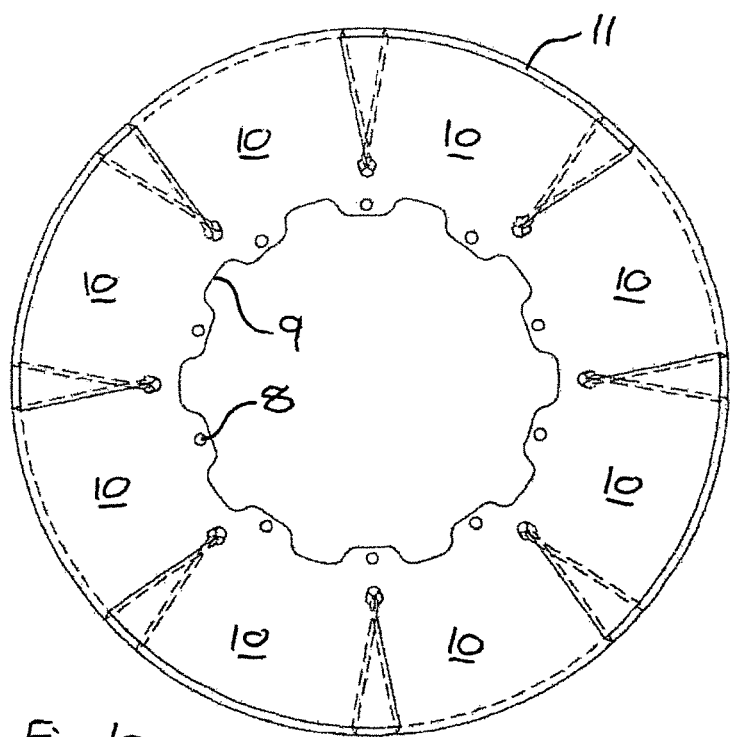
FIG. 10 shows a bent two-sided hub plate, as seen from the front.
Figure 11:
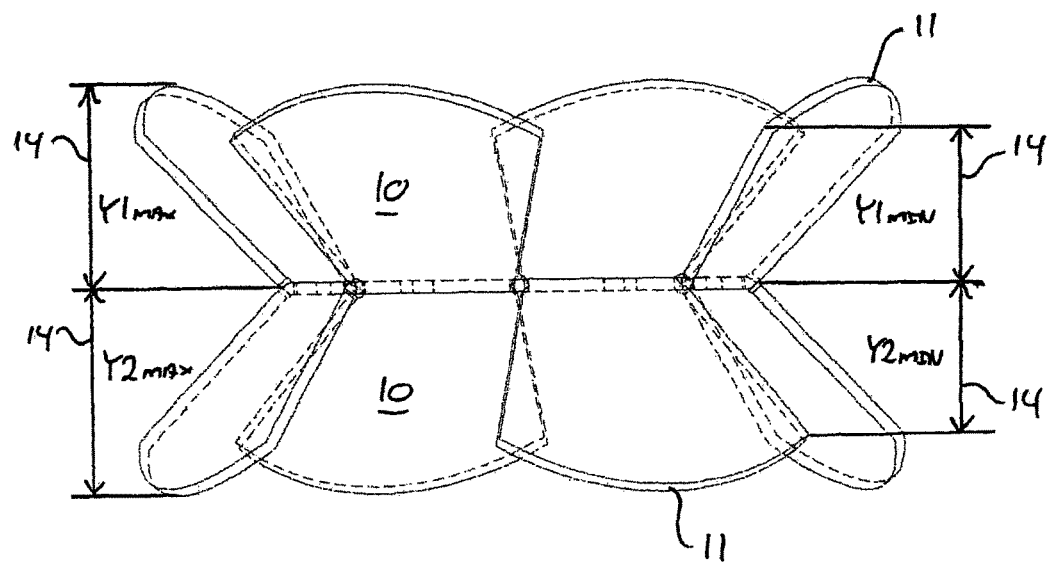
FIG. 11 shows a bent two-sided hub plate, as seen from the side.

FIG. 10 shows a bent two-sided hub plate 16 in a front view, and FIG. 11 shows a bent two-sided hub plate 16 as seen from the side. In both FIGS. 10 and 11, the two-sided hub plate 16 is ready for mounting in two not shown rim rings 2.

FIG. 11 furthermore shows clearly what is meant by the offset 14 of the hub plate. Since the outer periphery 11 on the hub plate 16 is not in the same plane due to the shape of the flaps 10, the offset 14 has in principle a size Y1 at one side and a size Y2 at the other side. The size of Y1 as well as Y2 varies between a maximum and a minimum, where maximum Y1max and Y2max are shown at one side, and where minimum Y1min and Y2min are shown at the other side of FIG. 11.

Figure 12:
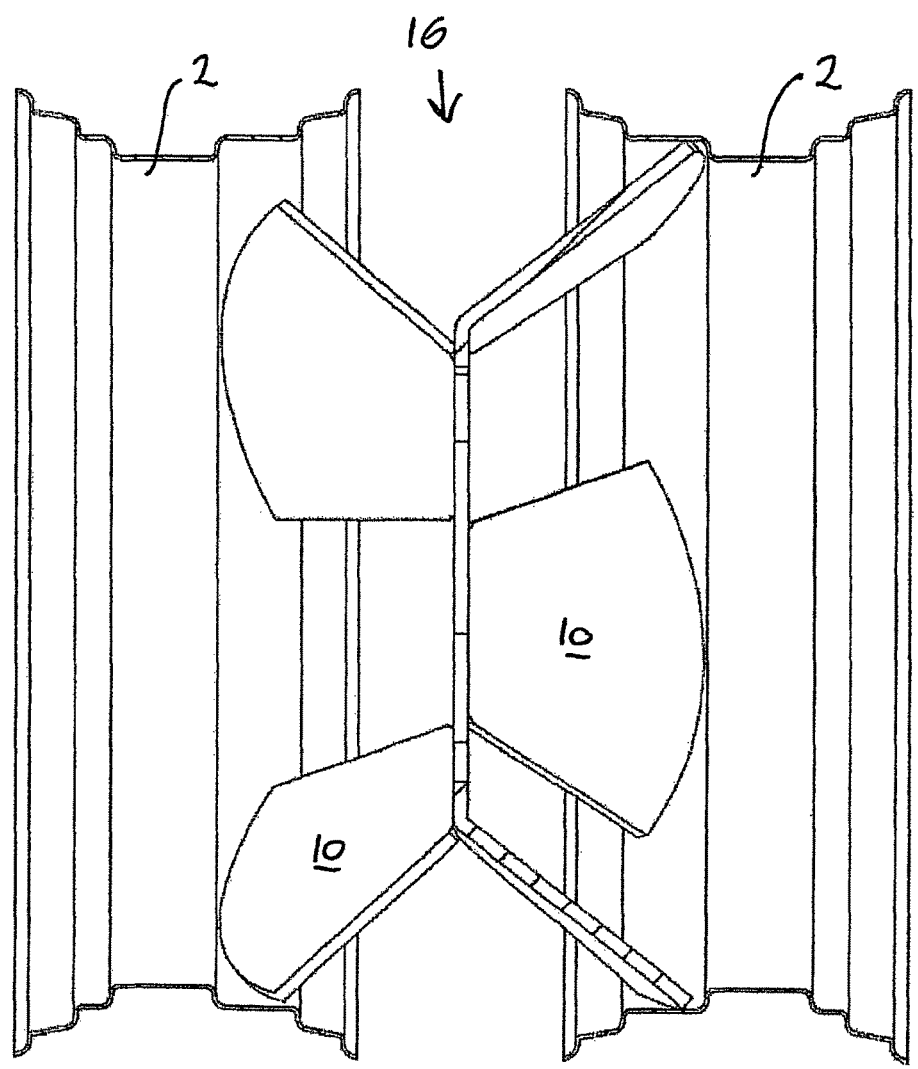
FIG. 12 shows a cross-section of two rim rings fitted with a two-sided hub plate.

Finally, in FIG. 12 is seen a cross-section of two rim rings 2 fitted with a two-sided hub plate 16.

The invention claimed is:

1. A wheel construction for an agricultural machine, where the wheel construction at least includes a first wheel rim having a first rim ring for mounting a first tire and further including a first hub plate with an outer periphery, the first hub plate at outer periphery being fixed to the first rim ring at a first distance from an annular edge of the first rim ring, and where the first hub plate extends radially in the first rim ring and between the first rim ring and the central axis of an opening of the first wheel rim, the first hub plate at an inner periphery including a number of holes and a contact face for mechanical and detachable fixing to either a central hub plate or directly to a hub of a vehicle, wherein a central hub plate at an outer periphery includes a contact face and holes for direct or indirect joining with the first hub plate at the inner periphery, and the inner periphery including a contact face and holes for joining with a hub on a vehicle, wherein the inner periphery on the first hub plate of the wheel construction is displaced by a second distance along the central axis of the first wheel rim in relation to the outer periphery of the first hub plate, where the outer periphery of the first hub plate is circular/cylindrical as seen in direction of the central axis of the first wheel rim, where the first hub plate includes a central part, where in the radial direction, a number of flaps, extend from the central part, where part of these flaps are bent in a first direction, and where each flap is shaped at the outer periphery such that the outer periphery of the bent flaps have a circular/cylindrical outer periphery with a given diameter.

2. The wheel construction according to claim 1, wherein the first hub plate at the outer periphery is fixed to the rim ring at the first distance from one B annular edge of the rim ring, the first distance varying along the outer periphery on the individual flap, where the variation is substantially sinusoidal.

3. The wheel construction according to claim 1, wherein the wheel construction further includes a second wheel rim, the second wheel rim having a second rim ring for mounting a second tire, and further including a second hub plate including an outer periphery, the second hub plate being fixed to the second rim ring at a third distance from the second rim and extending radially in the second rim ring towards the central axis of the second wheel rim, where the second hub plate at an inner periphery includes a number of holes and a contact face for mechanical and detachable fixing to either the first hub plate, a central hub plate or directly to a hub on a vehicle.

4. The wheel construction according to claim 3, wherein at least one of the first and the second hub plates are offset and include the outer periphery which is offset relative to the inner periphery along the central axis of the two wheel rims, wherein the size of the offset of the first hub plate is the second distance and the size of the offset of the second hub plate is a fourth distance, and where the total offset at the two hub plates is equal to the sum of the second distance and the fourth distance, and where the total offset is greater than the sum of distances from the annular edges of the rim rings to the outer periphery of the hub plates.

5. The wheel construction according to claim 3, wherein the first and the second wheel rims are bolted together at the inner periphery of the first and the second hub plate, respectively.

6. The wheel construction according to claim 1, wherein the wheel construction includes at least a second wheel rim, where the wheel construction further includes a spacer member including a central part, where in the radial direction a number of flaps extend from the central part, where every other of these flaps are bent in a first direction while the rest of the flaps are bent in a different and opposite direction, where the flaps that are bent in the same direction each have a design at the outer periphery such that by a set of bent flaps a circular/cylindrical outer periphery with a given diameter is formed.

7. A method for making a wheel construction for an agricultural machine, where the wheel construction at least includes a first wheel rim having a first rim ring for mounting a first tire, and further includes a first hub plate with an outer periphery, the first hub plate being fixed to the rim ring at a first distance from an annular edge rim ring and extending in the first rim ring radially towards the central axis of the first wheel rim, the first hub plate at an inner periphery including a number of holes and a contact face for mechanical and detachable fixing to either a central hub plate or directly to a hub of a vehicle, wherein a central hub plate at an outer periphery includes a contact face and holes for at least indirect joining with the first hub plate at the inner periphery, and at the inner periphery includes a contact face and holes for joining with a hub on a vehicle, wherein the first hub plate is formed of a plate-shaped workpiece, as the workpiece is machined by a cutting tool, such that the hub plate is formed with an outer periphery with a number of projecting flaps, these flaps having a shape at the outer periphery such that when respective flaps are formed, the first hub plate displays an offset between the outer and the inner peripheries with a second distance and at the same time appears with a circular/cylindrical outer periphery with a given diameter.

8. The method for making the wheel construction according to claim 7, wherein the wheel construction is made up of a first wheel rim and a second wheel rim, wherein the two wheel rims are joined at least indirectly at their respective offset hub plates.

9. The method for making the wheel construction according to claim 7, wherein the work piece of which at least the first hub plate is formed, is shaped using a method whereby the work piece is provided with at least a concave geometry.

10. The method for making the wheel construction according to claim 7, wherein the cut and deformed hub plate is welded to the rim ring along the outer periphery of the flaps as the welding seam runs along a substantially sinusoidal path.

11. The wheel construction according to claim 3, wherein the first and the second wheel rims are bolted together at a central hub plate.

12. The method for making the wheel construction according to claim 8, wherein the work piece of which at least the first hub plate is formed, is shaped using a method whereby the work piece is provided with a concave geometry and a convex geometry.

\* \* \* \* \*